Figure 2:
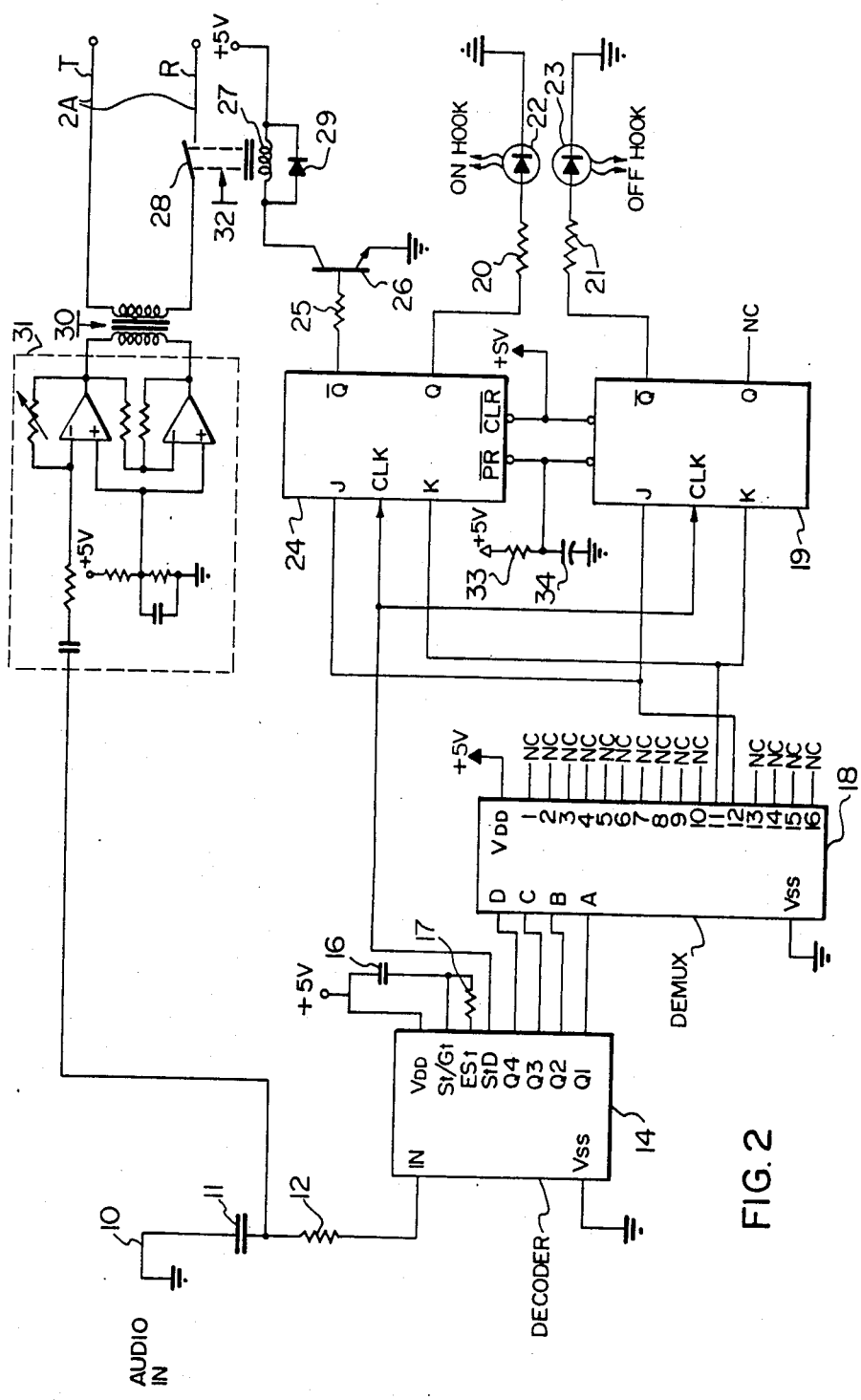

United States Patent [19]

Deveson et al.

[11] Patent Number: 4,685,122
[45] Date of Patent: Aug. 4, 1987

[54] INTERFACE CIRCUIT FOR REMOTE CONTROL OF A PABX

[75] Inventors: Daniel A. Deveson, Nepean; Anthony J. Bawcutt, Ottawa, both of Canada

[73] Assignee: Mitel Corporation, Canada

[21] Appl. No.: 691,421

[22] Filed: Jan. 14, 1985

[30] Foreign Application Priority Data

May 4, 1984 [CA] Canada .................................. 453611

[51] Int. Cl.$^4$ ....................... H04M 11/00; H04M 3/42
[52] U.S. Cl. ...................................... 379/90; 379/201; 379/218; 434/379
[58] Field of Search ................... 179/2 A, 2 R, 2 TV, 179/2 TS, 18 BC, 18 B, 175.2 C; 434/307, 321, 379

[56] References Cited

U.S. PATENT DOCUMENTS

| 3,654,708 | 4/1972 | Brudner | 434/307 |
|---|---|---|---|
| 3,882,538 | 5/1975 | Lowe | 434/307 |
| 4,332,980 | 6/1982 | Reynolds et al. | 179/2 A |
| 4,451,701 | 5/1984 | Bendig | 179/2 TV |
| 4,539,435 | 9/1985 | Eckmann | 179/2 A |

Primary Examiner—James L. Dwyer
Attorney, Agent, or Firm—Laff, Whitesel, Conte & Saret

[57] ABSTRACT

An interactive audio/visual demonstration system for connection to a telephone system, comprising an audio/visual unit connected to an interface circuit. The interface circuit decodes DTMF tones received from the audio/visual unit and in response causes implementation of one or more special features in the telephone system. The interface circuit is preferably connected to an audio track of a video tape recorder, and to the telephone system, such as a PABX, in order to implement a highly interactive video tape presentation in response to a video tape being played on the video tape recorder. The interface circuit is of simple construction and hence durable and inexpensive.

31 Claims, 5 Drawing Figures

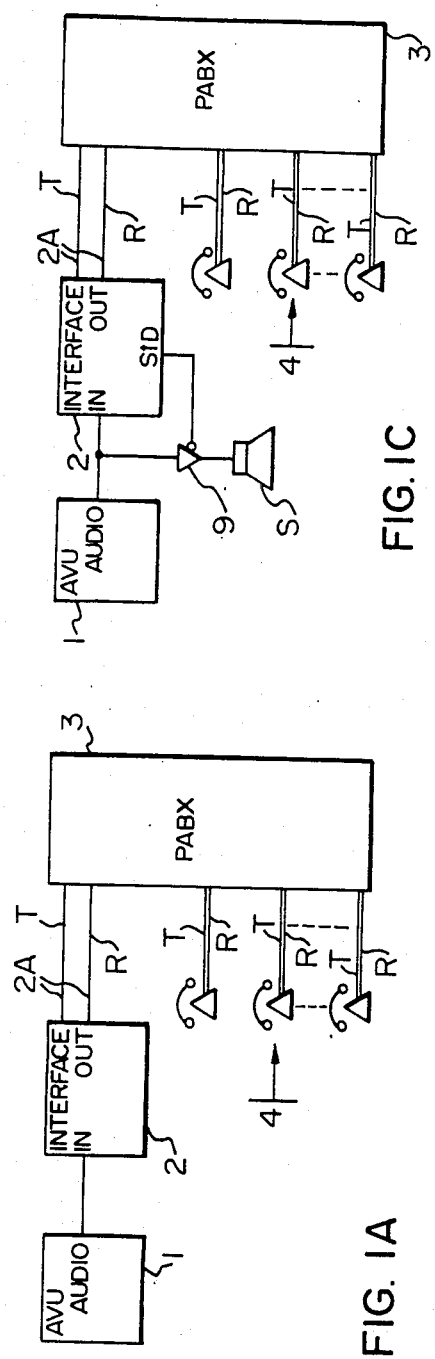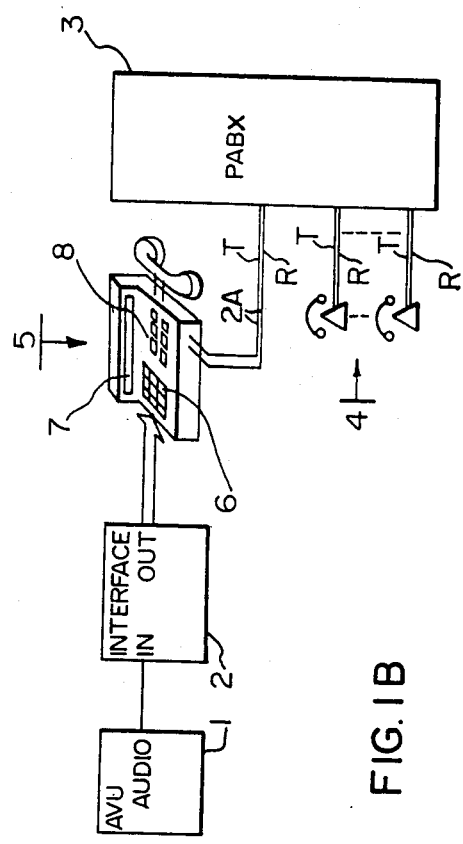

INTERFACE CIRCUIT FOR REMOTE CONTROL OF A PABX

In general, this invention relates to audio/visual demonstration systems, and more particularly to an audio/visual unit, such as a video tape recorder, connected to an interface circuit for controlling telephone equipment.

Manufacturers of telephone equipment frequently demonstrate their equipment in one or more displays at a variety of trade shows and seminars. Such manufacturers often demonstrate special features of the telephone equipment, and techniques for implementing these features, to prospective purchasers and other interested parties in attendance at the trade shows and seminars.

Manufacturers are also frequently required to train a large number of sales personnel in the operation and use of their equipment. The sales personnel are, in turn, faced with the task of demonstrating the operation and use of the telephone equipment to end users.

For instance, a PABX is typically capable of implementing a wide variety of special features such as call hold, call forwarding, call transfer and camp-on, etc. Users of the PABX are required to be thoroughly conversant with these special features and the techniques for implementing them. Hence, sales and training staff often give presentations that instruct the prospective purchasers, sales trainees, and ultimately the end users, in the operation and use of the PABX and the techniques for implementing the special features.

Special feature implementation in some PABXs can be initiated by, and controlled from, telephone sets or extensions connected to the PABX, by performing a hookswitch flash, and dialling one or more predetermined digits, designative of a particular special feature. A standard push button telephone set (such as the well known type 500 set), typically has a pair of hookswitch buttons disposed between handset cradles of the set, and upon which the handset rests when not in use. The telephone set is said to be on-hook when the hookswitch buttons are depressed and off-hook when the buttons are released. In the event the telephone set is off-hook, a low impedance current path is established between tip and ring leads connected to the PABX and the telephone set. PABX control circuitry detects increased current flow through the low impedance current path, and in response establishes a communication path between the telephone set and PABX via the tip and ring leads. In the event the telephone set goes on-hook, a high impedance current path is established between the tip and ring leads, and the PABX control circuitry detects decreased current flow through the high impedance current path. If the telephone set remains on-hook for longer than approximately ½ second, the PABX control circuitry breaks the communication path between the telephone set and PABX.

To initiate a special feature from an off-hook, standard push button telephone set, the hookswitch buttons are momentarily depressed, (for approximately ½ second), and then released. This is known in the art as performing a hookswitch flash. The PABX control circuitry detects the hookswitch flash on the tip and ring leads and waits for a predetermined one or more digits to be dialled designative of a particular special feature. The predetermined digits are then dialled, and the PABX implements the particular special feature in response to reception of the dialled digits.

For example, in order to place a call on hold in some PABXs, a subscriber using a standard off-hook push button telephone set performs a hookswitch flash, and then dials a predetermined digit or digits designative of the call hold special feature. The PABX control circuitry detects the hookswitch flash and receives the subsequently dialled digits, and in response places the call on hold. The subscriber can then implement other special features or attend to other matters until such time as he or she wishes to retrieve the call.

Other telephone sets, referred to herein as special sets, are connected to a PABX through tip and ring leads and typically have a plurality of special feature keys disposed therein. In order to implement a special feature from a special set, one or more of the special feature keys are depressed in a prescribed order. An internal control circuit, within the special set, detects depression of the special feature keys and generates and applies a control signal to the tip and ring leads connected to the PABX in response thereto. For instance, to place a call on hold using a special set, the subscriber merely depresses a predetermined one or more special feature keys on the special set, causing the internal control circuit to generate and apply a predetermined control signal designative of the call hold feature to the tip and ring leads. The PABX control circuitry receives the predetermined control signal and implements the call hold feature in response thereto.

In the past, sales and training staff of PABX manufacturers have presented live demonstrations for instructing the prospective purchasers, sales trainees, and end users in the operation and use of the PABX and the techniques for implementing the special features. Live demonstrations have been known to sustain the interest of a viewer because of their highly interactive nature. The viewer is able to interact directly with an instructor giving the demonstration, and benefit from hands-on experience with the PABX. By experimenting with the PABX, the viewer learns through first hand experience how various special features are initiated and implemented. However, such live demonstrations are costly because a large number of man-hours are required to provide continuous demonstration over extended periods of time. Also, live demonstrations can last for longer than the viewer is willing to watch. At a trade show, for instance, the viewer may prefer to browse the displays at his or her own leisure but may feel obliged to participate in an entire live demonstration against his or her preference, in order not to offend the instructor.

As an alternative, recorded audio/visual demonstrations have been presented for illustrating PABX special features, and instructing viewers in the techniques for implementing the special features. The viewer feels no obligation to participate in the entire demonstration should he or she prefer to browse. Audio/visual demonstrations are also considerably less expensive to present than live demonstrations. However, the inherently low level of interaction between an audio/visual unit and the viewer can result in an uninteresting demonstration. The viewer may be less inclined to pay attention to a non-interactive audio/visual demonstration than to a highly interactive demonstration, such as a live demonstration.

The present invention overcomes the problems associated with prior art non-interactive audio/visual presentations by providing a highly interactive demonstration system, yet is inexpensive, thus overcoming the cost disadvantage of prior art live demonstrations.

According to a preferred embodiment of the invention, an audio/visual unit such as a video tape recorder, for playing a recorded audio/visual tape in conjunction with a TV set, is connected to an interface circuit connected to a telephone system, such as a PABX. The interface circuit is of simple construction, and hence inexpensive and sufficiently durable and rugged to withstand the rigours of being set-up, taken down and transported from one sales presentation to the next, or being shipped to a large number of end users.

A demonstration, by an instructor, of techniques for implementing PABX special features is recorded on the tape, and when it is played on the video tape recorder, audio signals are generated by the video tape recorder and are received by the interface circuit. The interface circuit decodes predetermined ones of the audio signals and in response causes implementation of one or more special features of the PABX. Hence, the PABX implements the special features in the environment of the viewer while he or she watches the audio/visual demonstration of the corresponding techniques for implementing the various special features. In other words, the invention causes real time implementation of the special features simultaneously with the audio/visual unit giving an audio/visual presentation.

For instance, the instructor can be shown on a video screen of the TV set dialling a digit, on a telephone set, corresponding to a telephone extension in the environment of the viewer, which is caused to ring. The instructor can then direct the viewer to answer the ringing extension. The viewer then answers the extension, and hears the voice of the instructor in the earpiece of the answered extension. The instructor can then direct the viewer to implement one or more special PABX features from the answered extension. In this way, the viewer participates interactively with the audio/visual demonstration system.

According to the present invention, one-on-one training can be equitably reproduced without resorting to a live demonstration. A trainee can replay the recorded audio/visual tape as many times as required, until he or she is adequately trained. The viewer at a trade show experiences no obligation to participate in the presentation and feels free to browse at his or her own leisure. However, it is believed that such a new and unusual interactive demonstration system will attract many viewers to the display.

In general, one embodiment of the invention is an interactive audio/visual demonstration system comprised of an audio/visual unit for giving an audio/visual presentation, having an output terminal for carrying audio signals, a telephone system for implementing one or more special telephone system features, and an interface circuit, connected to the output terminal and the telephone system, for causing implementation of one or more of the special features in response to reception of a predetermined one or more of the audio signals and transmitting the aforementioned audio signals to the telephone system. The telephone system thus implements the special features simultaneously with the audio/visual unit giving the presentation.

Another embodiment of the invention is an interface circuit for control of a telephone system, comprising circuitry for transmitting audio signals received from an audio/visual unit to a telephone system, and a control circuit, connected to the circuitry for transmitting audio signals and to the telephone system, including circuitry for receiving the audio signals from the output terminal and transmitting the audio signals to the telephone system, and circuitry for causing implementation of one or more special features in the telephone system in response to reception of a predetermined one or more of the audio signals, whereby the telephone system implements the one or more special features simultaneously with the audio/visual unit giving an audio/visual presentation.

Another embodiment of the invention is a method for controlling a telephone system from an audio/visual unit for giving an audio/visual presentation, comprising the steps of receiving DTMF tones from the audio/visual unit, decoding the tones, and generating one or more control signals for causing the telephone system to implement one or more special features in response to predetermined ones of the DTMF tones being decoded, whereby the telephone system implements the one or more special features simultaneously with the audio/visual unit giving the audio/visual presentation.

Figure 3:
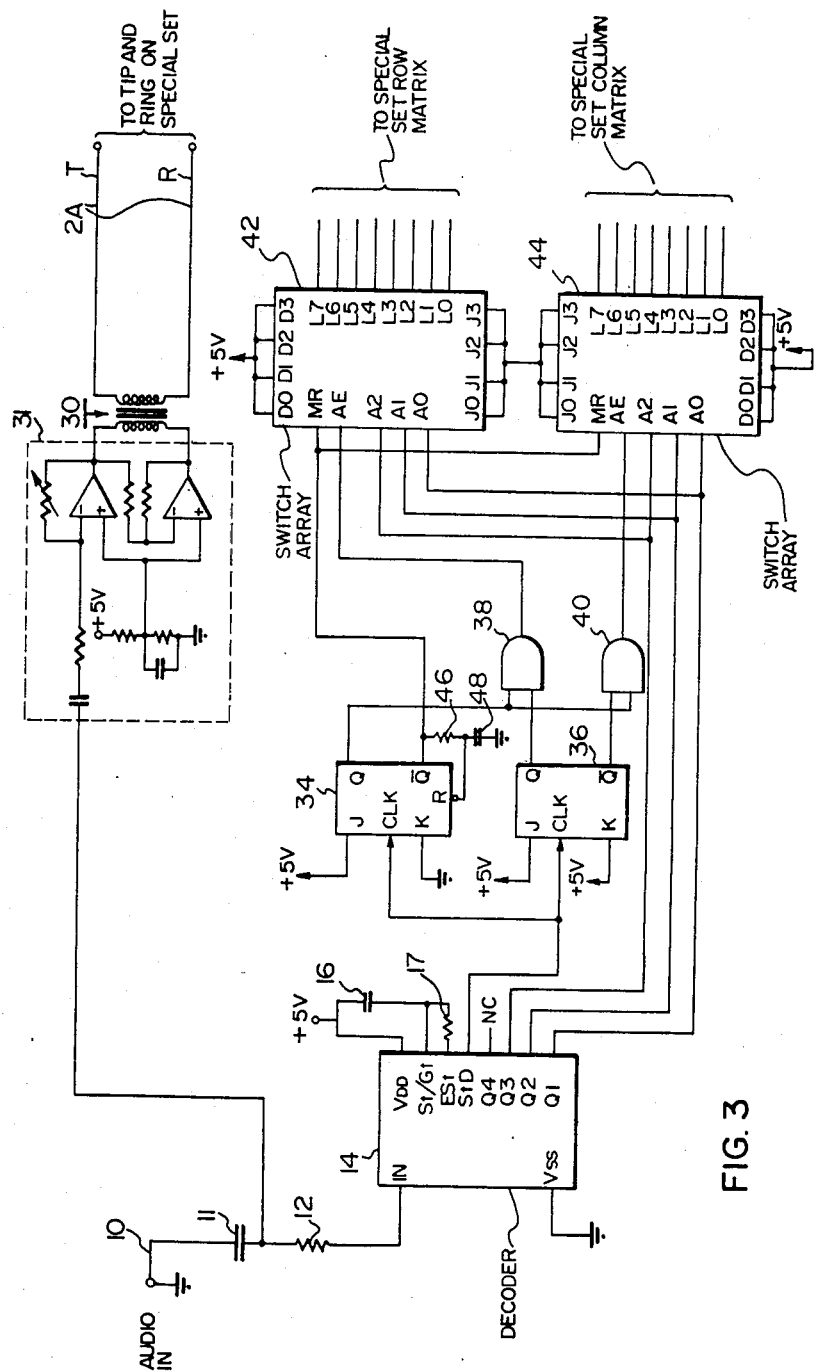

A better understanding of the invention will be obtained by reference to the detailed description below, in conjunction with the following drawings, in which:

FIG. 1A is a block diagram illustrating a preferred embodiment of the invention connected to a PABX, FIG. 1B is a block diagram illustrating a first alternative embodiment of the invention connected to a special telephone set which is connected to a PABX, FIG. 1C is a block diagram illustrating a second alternative,embodiment of the invention connected to a PABX, FIG. 2 is a schematic diagram of an interface circuit according to the preferred embodiment of the invention, and FIG. 3 is a schematic diagram of an interface circuit according to the first alternative embodiment of the invention.

With reference to FIGS. 1A, 1B and 1C, an audio/visual unit AVU 1, is shown connected to an interface circuit 2. AVU 1 can be any of a number of well known video cassette recorders or video disc players in conjunction with a TV set having a video screen. Alternatively, AVU 1 can be a slide projection/cassette system or movie projector in conjunction with a movie screen etc. An audio/visual unit, AVU 1, typically has an audio output for carrying audio signals. For instance, most video cassette recorders, such as the Panasonic model number PV 1220 video cassette recorder, have an audio output which can be connected to an input of a stereophonic sound system, or the like, for reproduction of the audio signals carried by the audio output, in response to a video cassette being played. An audio output, AUDIO, of AVU 1, is connected to an input IN, of interface circuit 2.

With reference to FIGS. 1A and 1C, an output OUT, of interface circuit 2 is connected to tip and ring leads, T and R, 2A, of any local telephone line of a PABX 3.

A plurality of telephone sets 4 are shown in FIGS. 1A, 1B and 1C, connected to PABX 3 by respective tip and ring leads, T and R, in the normal manner.

Dual tone multi-frequency (DTMF) tones can be recorded on an audio track of an audio/visual tape, or in case of a motion picture film, on the audio track of the film. The tape, or film, can then be played on AVU 1 such that the DTMF tones are transmitted from the audio output, AUDIO, and are received by the input IN, of interface circuit 2. The DTMF tones received from AVU 1 are decoded in interface circuit 2, which, in response to decoding predetermined ones of the DTMF tones, causes PABX 3 to implement one or more special features, as described in greater detail below.

With reference to FIGS. 1A and 1C, interface circuit 2 causes a hookswitch flash to be performed on the tip and ring leads, T and R, 2A, in response to the predetermined DTMF tones being decoded. AVU 1 subsequently generates one or more further DTMF tones recorded on the audio tape which are received from the AUDIO output and are amplified in interface circuit 2 and are transmitted along the tip and ring leads, T and R, 2A, for reception by PABX 3. Control circuitry within PABX 3 detects the hookswitch flash and implements the special feature in response to reception of the further DTMF tones, as discussed above.

With reference to FIG. 1B, illustrating the first alternative embodiment of the invention, interface circuit 2 is connected to special telephone set, special set 5, having numbered keys 6 and special feature keys 8 disposed therein. The numbered keys 6 correspond to dialling keys found on the standard push button telephone set. Special feature keys 8 and numbered keys 6 are typically connected to corresponding contact switches of an internal switching matrix comprised of a plurality of column and row leads. When a subscriber depresses one of the special feature keys 8, the corresponding contact switch closes connecting one of the column leads to one of the row leads of the matrix. An internal control circuit within the special set 5 then generates one or more control signals for application to the PABX 3 via the tip and ring leads, T and R, 2A. Control circuitry within PABX 3 detects the control signals and implements a predetermined special feature in response thereto.

Interface circuit 2 causes predetermined ones of the contact switches to be automatically closed in response to receiving predetermined ones of the DTMF tones. In response, the internal control circuit within special set 5 generates the control signals and transmits them to PABX 3 via the tip and ring leads, T and R, 2A. The control signals can be, for instance, amplitude modulated digital signals. PABX 3 then implements the special feature in response to receiving the control signals.

There are eight distinct standard DTMF tone frequencies, two frequencies being generated simultaneously. The eight distinct frequencies are divided into two four-frequency groups; high and low groups. A single DTMF tone consists of one tone from the high group, and one from the low group. Hence, there are sixteen different tone combinations.

The standard push button telephone set typically has a keyboard with four rows by three columns of numbered keys, labelled consecutively from "0" to "9", "*" and "#". By depressing one of the keys, a predetermined DTMF tone is generated. Hence, only twelve of the sixteen tone combinations are utilized on a standard telephone set.

A special set 5 can typically have up to at least sixty-four keys 6 and 8, connected to the internal matrix having up to eight rows and eight columns. However, as discussed above, the special set 5 typically generates control signals, other than DTMF tones, to the PABX 3 for implementing special features.

With reference to FIG. 1A, predetermined DTMF tones, corresponding to the tones generated in response to predetermined keys of a standard push button telephone set being depressed, are recorded on the audio track of an audio/visual tape. The tape is then played on AVU 1 such that the recorded DTMF tones are transmitted from the AUDIO output and are received by interface circuit 2 which, in response, generates an off-hook or on-hook signal, respectively, for transmission to PABX 3.

In a successful embodiment of the invention, the DTMF tones generated in response to depressing the "*" or "#" keys of a standard push button telephone set, were used as control tones for causing generation of the off-hook and on-hook signals, respectively. However, other possible DTMF tone combinations can be used.

In operation, with reference to FIG. 1A, an audio/visual demonstration is recorded on the tape, for illustrating implementation of one or more PABX special features. The tape is then played on AVU 1, which causes a video (or movie) screen to show an instructor going off-hook on a standard push button telephone set, at which time AVU 1 transmits a first DTMF tone recorded on the audio track of the tape and associated with depression of the "*" key. Interface circuit 2 decodes this tone and causes a low impedance connection to be established between the tip and ring lead pair, T and R, 2A, connected to PABX 3. Control circuitry within PABX 3 detects increased current flow through the low impedance connection and establishes a communication path between AVU 1 and PABX 3 via the tip and ring leads, T and R, 2A, as discussed above. The instructor is then shown on the screen performing a hookswitch flash, and the AUDIO output, generates a further tone sequence associated with depression of the "#" key followed by the "*" key, having approximately 178 second duration. The "# *" tone sequence is decoded in interface circuit 2 which causes a high impedance to be momentarily connected (for approximately ½ second) between the tip and ring leads, T and R, 2A, after which the low impedance is re-connected and maintained. In other words, the interface circuit 2 performs a hookswitch flash on the tip and ring leads, T and R, 2A. The instructor is then shown dialling a predetermined digit or digits designative of the particular special feature to be implemented. DTMF tones recorded on the audio track of the tape, corresponding to the dialled digits are received from the AUDIO output, are amplified and are transmitted for reception by PABX 3 via the tip and ring leads, T and R, 2A. The control circuitry within PABX 3 detects the hookswitch flash and implements the particular special feature in the environment of the viewer, in response to receiving the DTMF tones corresponding to the dialled digits.

In order to demonstrate to the viewer how a call is transferred to another extension having a particular extension number, the instructor is shown on the screen performing a hookswitch flash and dialling the particular extension number. Interface circuit 2 decodes the "# *" DTMF tone sequence received from AVU 1, performs a hookswitch flash on the tip and ring leads, T and R, 2A, in response thereto, and transmits subsequently received DTMF tones corresponding to the dialled extension number, from AVU 1 to the PABX 3. The control circuitry within PABX 3 detects the hookswitch flash, receives the DTMF tones and causes the other extension (one of extensions 4 in FIGS. 1A and 1C), to ring in the environment of the viewer. The viewer may then answer the ringing extension 4, thus completing a communication path extending from the answered extension 4, through PABX 3 to the audio track of AVU 1. The viewer can then hear the recorded voice of the instructor through the handset of the answered extension 4. The instructor can then direct the viewer to perform a hookswitch flash and dial further digits, etc., such that the viewer interacts with the demonstration system.

With reference to FIG. 1B, a subscriber using a special telephone set, special set 5, typically implements a special feature of PABX 3 by depressing one or more of the special feature keys 8, in a prescribed order, as described above. For instance, in order to forward an incoming call to a particular one of the extensions 4, the subscriber depresses a particular one or more of the keys 8 for implementing the call forward feature, and subsequently dials the particular extension number on numbered keys 6. A visual indication of the special feature being implemented is provided by a display 7, such as an LCD, CRT or LED display.

In operation, with reference to FIG. 1B, an audio/visual tape is played on AVU 1 having DTMF tones recorded on an audio track thereof. The DTMF tones are transmitted from the AUDIO output of AVU 1 to the IN input of interface circuit 2. The DTMF tones are decoded therein causing interface circuit 2 to automatically close predetermined ones of the contact switches of the internal matrix of column and row leads of the special set 5, as discussed in greater detail below with reference to FIG. 3. The special set 5 then generates control signals to PABX 3 for causing implementation of the special feature, as discussed above.

For instance, in an audio/visual presentation, the instructor can be shown (on a video screen), lifting the handset of a special set 5, depressing one the special feature keys 8, such as a "call forward" key, and dialling the particular extension number on number d keys 6. Interface circuit 2 receives DTMF tones from AVU 1 and in response causes predetermined ones of contact switches of the internal matrix of a local special telephone set 5 located in the environment of the viewer and PABX, to close. Control circuitry in the local special set 5 then generates control signals to PABX 3 for implementing the call forward feature. Display 7 indicates the feature being implemented and the particular extension 4 to which the call is being forwarded. The particular extension 4 then rings and can be answered by the viewer, as discussed above with reference to FIG. 1A.

An audio/visual unit AVU 1, such as a video tape recorder and TV set, typically includes a speaker disposed in the TV set for broadcasting signals recorded on the audio track of the tape. Transmission and broadcast of DTMF tones through the speaker can be distracting to a viewer during the audio/visual presentation.

One way of overcoming this problem is to utilize an audio/visual unit, AVU 1, having a stereophonic audio track, such as the Panasonic model NV8200 video cassette recorder. DTMF tones are recorded on a first channel and voice and other audio signals are recorded on a second channel of the stereophonic audio track. The audio output carrying the DTMF tones recorded on the first channel is connected to interface circuit 2 and the signals on the second channel are transmitted directly to the speaker. In this way, the DTMF tones are transmitted to interface circuit 2 for causing implementation of special features, yet they are not broadcast through the speaker.

The second alternative embodiment of the interactive audio/visual presentation system is shown in FIG. 1C and is typically used in conjunction with an audio/visual unit AVU 1 having a monaural audio track. DTMF tones are not transmitted to the speaker according to this alternative embodiment, yet voice and other audio signals are.

With reference to FIG. 1C, a transmission gate 9 is shown connected to the audio output, AUDIO, of AVU 1. An output of transmission gate 9 is connected to a speaker S, typically a component of the TV set of audio/visual unit AVU 1. A delayed steering output StD from interface circuit 2 is connected to a disable input of transmission gate 9. Delayed steering output StD is discussed in greater detail below, with reference to FIGS. 2 and 3.

In operation, in the event interface circuit 2 detects a valid DTMF tone, the delayed steering output StD goes high. Transmission gate 9 is thus disabled such that no DTMF tones are transmitted through gate 9 and broadcast through the speaker S.

In the event AVU 1 generates signals other than DTMF tones, such as voice signals, the delayed steering output StD of interface circuit 2 remains low, and these signals are transmitted through interface circuit 2 to PABX 3 in the usual manner. Hence, voice and other audio signals are broadcast through the speaker S.

In some instances, interface circuit 2 may require a predetermined amount of time, known as the response time, to detect a valid DTMF tone and cause implementation of the PABX special feature. For instance, in the event interface circuit 2 has a response time of approximately 100 milliseconds. Then the StD output is caused to go high approximately 100 milliseconds after the DTMF tones have been received by interface circuit 2. Hence, a 100 millisecond portion of the received DTMF tone is transmitted through transmission gate 9 so as to be broadcast through the speaker S. In order to alleviate this problem, an approximately 100 millisecond delay line can be connected between the audio output, AUDIO, of AVU 1 and transmission gate 9, such that audio signals transmitted to the speaker S are delayed by 100 milliseconds, and DTMF tones are thus not transmitted to the speaker S. For the best results, the audio track of the audio/visual tape should be offset with respect to the video track such that, in the event of a 100 millisecond audio delay, the audio and video signals are reproduced synchronously.

FIG. 2 illustrates a preferred embodiment of interface circuit 2, according to the invention.

Audio frequency signals are received from AVU 1 (FIG. 1A) by an AUDIO IN terminal of interface circuit 2 and are transmitted along an unbalanced lead 10, through AC coupling capacitor 11 and input resistor 12, to an input, IN, of a DTMF tone decoder 14.

DTMF tone decoders such as the Mitel Corporation model MT8870A integrated DTMF receiver, are well known in the art for generating a four bit data word corresponding to a received one of the 16 different DTMF tone combinations, and can be used as decoder 14.

A power supply input of decoder 14, VDD, is connected to a 5 volt power supply, and the negative power supply input, Vss, is connected to ground.

Outputs StD, ESt and input St/Gt, in combination with resistor 17 and capacitor 16, comprise logic steering circuitry for determining whether a valid DTMF tone has been received. Early steering output ESt is connected through resistor 17 to input St/Gt which is connected to the 5 volt power supply through capacitor 16. A logic high on ESt causes the voltage at the node connecting resistor 17 and capacitor 16 to rise. This voltage rises with respect to time at a rate governed by an RC time constant due to the parallel combination of resistor 17 and capacitor 16. In a successful embodiment of the invention, resistor 17 was 237 kohms and capacitor 16 was 0.1 µF., yielding an RC time constant of 23.7 msec. Early steering output ESt goes to a logic high when a valid DTMF tone is detected. Any momentary loss of signal causes ESt to return to a logic low. Provided the detected DTMF tone remains valid, the voltage at the St/Gt input rises to a predetermined threshold level whereby delayed steering output, StD, is caused to go to a logic high, indicating a valid received tone.

Q1, Q2, Q3 and Q4 are three state data outputs for providing a four bit data word corresponding to the last valid DTMF tone received. The four bit data word is latched to outputs Q1–Q4 in response to output StD going high. Output StD is connected to the clock inputs of falling edge triggered J-K flip-flops 19 and 24. Outputs Q1, Q2, Q3 and Q4 are connected to A, B, C and D inputs respectively, of a 4 bit input to 16 bit output demultiplexer 18.

Outputs 11 and 12 of demultiplexer 18 are connected to K and J inputs respectively of both J-K flip-flops 19 and 24, and outputs 1–10 and 13–16 are unconnected. Power supply inputs VDD and VSS of demultiplexer 18 are connected to 5 volts and ground respectively.

The clear inputs, $\overline{CLR}$, of flip-flops 19 and 24 are connected to 5 volts, and are thereby disabled. The preset inputs $\overline{PR}$ of flip-flops 19 and 24 are connected to 5 volts through pull up resistor 33 and to ground through capacitor 34. When interface circuit 2 is initially powered up, the $\overline{CLR}$ inputs of flip-flops 19 and 24 go high and capacitor 34 begins charging such that the $\overline{PR}$ inputs stay momentarily low. While the $\overline{CLR}$ inputs are high and the $\overline{PR}$ inputs are initially low, flip-flops 19 and 24 are reset such that Q outputs thereof go high and $\overline{Q}$ outputs thereof go low. After an amount of time governed by the time constant due to the RC combination of resistor 33 and capacitor 34, the voltage at the $\overline{PR}$ inputs rises to a logic high, and both the preset and clear inputs $\overline{PR}$ and $\overline{CLR}$, respectively, are disabled for normal operation.

Outputs Q and $\overline{Q}$ of flip-flops 24 and 19 are respectively connected to resistors 20 and 21 which in turn are connected to the anodes of light emitting diodes LEDs 22 and 23 respectively. The cathodes of LEDs 22 and 23 are connected to ground. The Q output of flip-flop 19 is unconnected.

The $\overline{Q}$ output of flip-flop 24 is connected to the base terminal of an NPN transistor 26, through resistor 25. The emitter terminal of transistor 26 is connected to ground and the collector terminal is connected to one end of a relay coil 27 of relay 32. The other end of relay coil 27 is connected to the 5 volt positive power supply. A protective diode 29 is connected across relay coil 27 in a well known manner. A normally open moving contact 28 of relay 32 is connected in series with the ring lead of tip and ring leads, T and R, 2A, connected to PABX 3.

The junction of capacitor 11 and resistor 12 is connected to the input of an amplifier circuit 31. Circuit 31 is a well known circuit and is typically comprised of a plurality of interconnected operational amplifiers, resistors and capacitors, for amplifying the audio signals transmitted along unbalanced lead 10. Amplifier circuit 31 is coupled to the tip and ring leads, T and R, 2A, leading to PABX 3 through a transformer 30. Transformer 30 and amplifier circuit 31 can alternatively be replaced by a solid-state hybrid circuit, in a well known manner.

In operation, with reference to FIG. 2, a DTMF tone recorded on an audio track of an audio/visual tape, is played back on AVU 1 so as to be received by the AUDIO IN terminal of the interface circuit 2 and transmitted along unbalanced lead 10. The DTMF tone is thus applied to the inverting input, IN, of decoder 14 which decodes the tone and generates a four bit data word on outputs Q1–Q4 in response thereto.

In the event a "*" (off-hook) tone is applied to the IN input of decoder 14, outputs Q4–Q1 generate the data word 1011, which is decoded in demultiplexer 18 to yield a logic high signal on output 11 and a logic low signal on output 12. Hence, a logic high signal is applied to the K inputs and a logic low signal is applied to the J inputs of flip-flops 24 and 19. Alternatively, if a "#" (on-hook) tone is received by decoder 14, outputs Q4–Q1 generate the data word 1100, which is decoded in demultiplexer 18 to yield a logic high signal on output 12 and a logic low signal on output 11. The logic high signal is applied to the J inputs and the logic low signal is applied to the K inputs of flip-flops 24 and 19.

When either of the "*" or "#" tones are generated by AVU 1 and are received by decoder 14, the steering circuitry described above detects a valid DTMF tone and delayed steering output StD goes high. Upon completion of generation the "*" or "#" tones, the StD output of decoder 14 goes low, and the decoded data word remains on the outpus Q1–Q4 thereof. Flip-flops 24 and 19 are preferably falling edge triggered flip-flops, and the signal on the J and K inputs thereof are clocked into flip-flops 24 and 19 in response to the StD output of decoder 14 going low. Falling edge triggered flip-flops are used to ensure that, when the instructor, shown on the TV set, initially goes off-hook and AVU 1 generates a "*" off-hook DTMF tone, moving contact 28 is open and the "*" tone is thus not transmitted via the tip and ring leads T and R, 2A, for reception by the PABX 3. The PABX 3 would interpret a received "*" tone as being a misdialled keystroke and thu disregard subsequently received DTMF tones. Hence, upon completion of generation of a "*" tone, the StD output of decoder 14 subsequently goes low, and a logic high signal is clocked into the K inputs and a logic low signal is clocked into the J inputs, which causes the $\overline{Q}$ outputs of flip-flop 29 and 19 to go high, thereby enabling NPN transistor 26. Similarly, if a "#" tone is received, a logic low signal is clocked into the K inputs and a logic high signal is clocked in the J inputs in response to the StD output going low, causing the Q outputs of flip-flops 14 and 29 to go high and the $\overline{Q}$ outputs thereof to go low, thereby disabling NPN transistor 26.

Data words on the A, B, C and D inputs of demultiplexer 18 other than 1011 and 1100 are decoded to yield logic low signals on outputs 11 and 12. Therefore, received DTMF tones other than "*" and "#" are decoded in decoder 14 and demultiplexer 18 and logic low signals are clocked into the J and K inputs, such that the Q and $\overline{Q}$ outputs maintain their previous state.

Current flows from the positive 5 volt supply through relay coil 27 of relay 32 to ground through the collector/emitter junction of transistor 26, in response to transistor 26 being enabled. Normally open moving contact 28 of relay 32 closes in response to relay coil 27 being energized, establishing a low impedance path between the tip and ring leads, T and R, 2A. Control circuitry in the PABX 3 detects the off-hook low impedance and establishes a communication path along the tip and ring leads, T and R, 2A, as discussed above with respect to FIG. 1A.

In the event a "# *" tone sequence is subsequently received, having duration of approximately ½ second, a hookswitch flash is performed on the tip and ring leads T and R, 2A, as follows; the "# *" tone sequence is decoded in decoder 14 and demultiplexer 18 such that the Q output of flip-flop 24 goes momentarily low. Transistor 26 is momentarily switched off and no current flows through relay coil 27. Contact 28 thus opens, and a high impedance is temporarily established between the tip and ring leads, T and R, 2A. The $\overline{Q}$ output of flip-flop 24 subsequently goes high again, in response to reception and decoding of the "*" tone, causing contact 28 to close, thereby re-establishing the low impedance connection between T and R, and completing the hookswitch flash.

Current is conducted from the $\overline{Q}$ output of flip-flop 19 through resistor 21 and LED 23 to ground in response to reception and decoding of the "*" signal by decoder 14. LED 23 is thus biased on and emits light, indicating that the interface circuit 2 has detected the off-hook DTMF tone. Similarily, when a "#" DTMF tone is received, the Q output of flip-flop 24 goes to a logic high and current flows therefrom through resistor 20 and LED 22 to ground. LED 22 is thus biased on so as to emit light, indicating detection of the on-hook DTMF tone. Thus, a visual indication of the on/off-hook status of the interface circuit 2 is provided.

Control circuitry within the PABX 3, in FIG. 1A, detects the hookswitch flash on the tip and ring leads, T and R, 2A, and receives further DTMF tones, designative of the predetermined special feature to be implemented. These further tones are generated from the AUDIO output of AVU 1, and transmitted via unbalanced lead 10 to amplifying circuit 31 via AC coupling capacitor 11. Circuit 31 amplifies the tones and applies them to transformer 30 for coupling to the tip and ring lead pair, T and R, 2A. PABX 3 then implements the predetermed features in response to receiving the further DTMF tones.

Other audio signals received from AVU 1, such as voice signals, are amplified and transmitted to PABX 3 via amplifier circuit 31 and transformer 30 for transmission to an off-hook extension. In this way, a viewer can hear signals on the audio track being transmitted through the handset of the off-hook extension. Alternatively, if one of the telephone extensions 4 in FIG. 1, is a speakerphone, the instructor shown on the video screen can place a call to the speakerphone extension. One of the viewers can answer the extension, and the instructor's voice can be subsequently broadcast through the speakerphone for illustrating intercom or speakerphone features of the PABX 3.

In order to disconnect the AVU 1 audio track from PABX 3, a "#" tone is generated by the audio/visual unit and applied to unbalanced lead 10. This signal is decoded in decoder 14 and demultiplexer 18 as described above, causing the outputs Q of flip-flops 19 and 24 to go low, thereby turning off transistor 26 and de-energizing relay coil 27. Moving contact 28, of relay 32, returns to its normally open condition, thus establishing a high impedance connection between the tip and ring leads, T and R, 2A. The PABX control circuitry recognizes a decrease in current flow between the tip and ring leads, T and R, 2A, and in response breaks the communication path between AVU 1 and PABX 3.

With reference to the embodiment shown in FIG. 3, decoder 14, audio input lead 10, capacitors 11 and 16, resistors 12 and 17, amplifier 31 and transformer 30 all function in an identical manner as described above with reference to FIG. 2. In addition to these common elements, switch arrays 42 and 44 are used for connection to row and column leads of the internal matrix in special telephone set 5, as discussed above with reference to FIG. 1B.

Also, flip-flops 34 and 36 are connected to the switch arrays 42 and 44. Flip-flops 34 and 36 have clock inputs connected to the StD output of receiver 14. Flip-flops 34 and 36 generate enabling signals for application to switch arrays 42 and 44 through AND gates 38 and 40. Switch arrays 42 and 44 are preferably addressable CMOS/LSI analog switch arrays, such as the Mitel MT8804A model 8×4 analog switch array. The J input of flip-flop 34 is connected to the 5 volt power supply, and the K input is connected to ground. The J and K inputs of flip-flop 36 are both connected to the 5 volt power supply. The Q output of flip-flop 36 is connected to one input of AND gate 38, the other input being connected to the Q output of flip-flop 34. The $\overline{Q}$ output of flip-flop 36 is connected to one input of AND gate 40, the other input being connected to the Q output of flip-flop 34. The $\overline{Q}$ output of flip-flop 34 is connected to one lead of a resistor 46, the other lead being connected to the reset input R of flip-flop 34 and to ground through a capacitor 48.

The $\overline{Q}$ output of flip-flop 34 is also connected to the master reset inputs, MR, of switch arrays 42 and 44. The outputs of AND gates 38 and 40 are connected to the address enable inputs AE, of switch arrays 42 and 44 respectively.

The Q1, Q2 and Q3 outputs of decoder 14 are connected to A0, A1 and A2 address inputs respectively, of both switch arrays 42 and 44. The D0, D1, D2 and D3 data inputs of switch arrays 42 and 44 are connected to the 5 volt power supply, and the terminals J0, J1, J2 and J3 of array 42 are connected together and to the J0, J1, J2 and J3 terminals of array 44 for providing an electrical connection between switch array 42 and switch array 44. With the D0, D1, D2 and D3 inputs of switch arrays 42 and 44 connected to +5 volts, a selected one of lines L0–L7 of switch array 42 is connected to all of the terminals J0–J3 of arrays 42 and 44, and therefrom to a selected one of lines L0–L7 of switch array 44.

Lines L0–L7 of switch array 42 are respectively connected to the eight row leads of the eight-by-eight matrix in special set 5 (not shown) as discussed above with reference to FIG. 1B, and lines L0–L7 of array 44 are respectively connected to the eight column leads of the matrix.

In operation, a tone sequence consisting of a pair of DTMF tones is recorded on the audio track of an audio/visual tape and played back on AVU 1 for transmission to decoder 14 via unbalanced lead 10. The tone sequence is decoded therein to provide a pair of sequentially generated data words on outputs Q1, Q2 and Q3 which are sequentially applied to the address inputs A0, A1 and A2 of switch arrays 42 and 44. The first of the pair of data words causes one of lines L0–L7 of switch array 42 to be selected. The second data word causes one of the lines L0–L7 of array 44 to be selected. The selected line of array 42 is connected to the selected line of array 44 through the commonly connected terminals J0–J3, as described in further detail below.

The StD output of decoder 14 goes high and data is clocked into flip-flops 34 and 36 in response to reception of a first valid DTMF tone by decoder 14. The $\overline{Q}$ output of flip-flop 34 goes low and the voltage at the node connecting resistor 46 and capacitor 48 drops toward ground potential at a predetermined rate. This rate is dependent on the time constant due to the parallel RC combination of resistor 46 and capacitor 48. In a successful embodiment of the invention, the RC time constant was approximately 500 milliseconds. When the voltage at the R input of flip-flop 34 falls to a predetermined level, (2.77 volts in the successful embodiment), the flip-flop is reset and the $\overline{Q}$ output goes high.

Flip-flop 36 is configured as a toggle, such that the Q output thereof goes high and the $\overline{Q}$ output goes low in response to a first clock signal from the StD output. The Q output goes low and the $\overline{Q}$ output goes high in response to a second clock input from the StD output of decoder 14. Hence, when the first tone is received and decoded, StD goes high causing the Q output of flip-flop 34, connected to AND gates 38 and 40, to go high. The Q output of flip-flop 36 goes high causing the output of AND gate 38 to go high thereby enabling switch array 42 through the AE input. The reset input, MR, of array 42 is initially at a low logic level and the data word on the Q1, Q2 and Q3 outputs of decoder 14 is decoded so as to select one of lines L0–L7 of switch array 42. Since the D0–D3 inputs of array 42 are tied high, the addressed line is connected to all of terminals J0–J3. Upon completion of generation of the first DTMF tone, the StD output of decoder 14 goes low.

The RC combination of resistor 46 and capacitor 48 ensures that in the event of drop-out on the audio/visual tape or decoder 14 not detecting one of the pair of DTMF tones, the interface circuit 2, which is required to receive and decode a pair of DTMF tones in order to close a contact switch of the matrix, disregards the other one of the DTMF tone pair. In other words, in the event of tape drop-out etc., and a second DTMF tone not being received and decoded within 500 milliseconds, the voltage at the junction of resistor 46 and capacitor 48 rises and switch arrays 42 and 44 are reset via the MR inputs, and the instruction is ignored.

After the first DTMF tone has been decoded, a second DTMF tone is received, preferably within approximately 500 milliseconds of the first, such that the voltage at the node connecting resistor 46 and capacitor 48 has not yet dropped below the above mentioned threshold, and the MR inputs of arrays 42 and 44 are still at a logic low level. The StD output of decoder 14 goes high again, the $\overline{Q}$ output of flip-flop 34 goes low and flip-flop 36 toggles such that the Q output thereof goes low and the $\overline{Q}$ output goes high. The output of AND gate 40 goes high and is applied to the address enable input AE of switch array 44. The data word on the Q1, Q2 and Q3 outputs of decoder 14 is then decoded in array 44 so as to select one of lines L0–L7.

With the MR and AE inputs of switch array 42 at a low logic level, there is no change of state therein. In other words, the previously selected line (L0–L7) is maintained despite changes on the address inputs A0, A1 and A2 due to the second received DTMF tone being decoded into a second data word. Therefore, the selected line L0–L7 of switch array 42 is connected through terminals J0–J3 thereof to corresponding terminals of switch array 44 and therefrom to one of the lines L0–L7 of array 44 selected as a result of reception of the second decoded DTMF tone.

A low impedance connection is thus established through the terminals J0–J3 between the selected lines L0–L7 of switch arrays 42 and 44. This causes the selected row lead of the matrix in the special set to be connected to the selected column lead, having the same effect as if a subscriber had physically depressed one of the keys 6 or 8 and closed a corresponding contact switch of the internal matrix. As a result, the internal control circuit of special set 5 generates and transmits the aforementioned control signal to the PABX 3 along the tip and ring leads, T and R, 2A, for implementing the special feature.

In summary, the invention is an interactive demonstration system utilizing an audio/visual unit, such as a video tape recorder and an interface circuit connected to a telephone system, such as a PABX. DTMF control tones are recorded on audio/visual tape and played back on the audio/visual unit so as to be transmitted to, and received by and decoded in the interface circuit which in response causes the PABX to implement one or more special features. The PABX then implements the special features in the environment of the viewers and simultaneously with the audio/visual unit giving an audio/visual presentation. In this way, an interactive demonstration can be provided on, with, and by the PABX.

As a result of this invention, it is believed that for the first time an audio/visual unit has been used to implement special features of a PABX system.

A person understanding this invention may now conceive of changes or other embodiments using the principles described herein. For instance, certain telephone set keyboards comprise four additional keys not found on ordinary push button telephone sets, denoted as A, B, C and D. Any of these keys and their associated DTMF tones, or any other tones, can be used instead of the "*" and "#" tones to cause implementation of the various PABX features. Four bit input to sixteen bit output demultiplexer 18 can be replaced by a BCD-to-decimal decoder or discrete logic gates (such as AND gates and inverters), and flip-flops 19, 14, 34 and 36 can be S-R or other types of flip-flops, with suitable changes being made for triggering. Also, normally open moving contact 28 of relay 32 shown in FIG. 2, can be connected in series with the tip lead as opposed to the ring lead of the tip and ring leads, T and R, 2A. Transistor 26 can be a PNP transistor with suitable changes being made for biasing.

In addition, the interface circuit 2 can be adapted to receive and respond to dial pulse signals generated by AVU 1 by connecting a dial pulse-to-DTMF tone converter to the input IN of the interface circuit 2.

Also, the embodiment of the interface circuit 2 described with reference to FIG. 3, can be used to simulate key closures of a standard computer keyboard terminal, for use with a voice and data telephone set, such as the Mitel KONTACT* voice and data telephone set.

*KONTACT is a registered trademark of Mitel Corporation.

For the purposes of illustrating the utility of the invention, reference has been repeatedly made to an application of the invention whereby a video tape recorder is interfaced to a PABX for the purposes of realizing an interactive video presentation. However, any controlling device capable of generating or transmitting DTMF tones can be interfaced to a telephone system through the interface circuit. For instance, an ordinary tape recorder can be used instead of the video tape recorder.

These and other changes or embodiments are all considered to be within the sphere and scope of this invention as defined in the claims appended hereto.

We claim:

1. In an interactive audio/visual demonstration system for giving an audio/visual demonstration of telephone system special features, an interface circuit comprising:
   (a) means for transmitting audio signals received from an audio/visual unit to a telephone system, and
   (b) control means, connected to said means for transmitting audio signals and said telephone system, for receiving said audio signals and generating one or more control signals for transmission to said telephone system in response to reception of a predetermined one or more of said
   whereby the telephone system implements one or more of said special features in response to receiving said one or more control signals, simultaneously with the audio/visual system giving said audio/visual demonstration of said special features.

2. An interface circuit for control of a telephone system as defined in claim 1, wherein said control means includes means for causing a simulated hookswitch flash on tip and ring leads for connection to the telephone system in response to the receipt of a first type of said predetermined audio signals, and for communicating a second type of said predetermined audio signals to the telephone system following said flash whereby the telephone system is caused to implement a predetermined one of said special features in response thereto.

3. An interface circuit for control of a telephone system as defined in claim 2, wherein said control means is comprised of:
   (a) a tone decoder for generating a predetermined digital signal in response to reception of said first type of predetermined audio signal,
   (b) enabling means, connected to said decoder, for generating an enabling signal for a predetermined amount of time in response to reception of said digital signal, and
   (c) relay means having a moving contact for connection in series with one of said tip and ring leads and a coil connected to said enabling means for receiving said enabling signal and opening said contact for said predetermined amount of time in response thereto,
   whereby a simulated hookswitch flash is caused in response to said moving contact being opened for said predetermined amount of time.

4. An interface circuit for control of a telephone system as defined in claim 3, wherein said enabling means is comprised of:
   (a) a demultiplexer connected to said decoder, for decoding said digital signal,
   (b) a flip-flop having first and second inputs connected to predetermined outputs of said demultiplexer, for generating a further control signal in response to receiving said decoded digital signal, and
   (c) a transistor having a control input connected to said flip-flop for receiving said further control signal therefrom, and a current conduction circuit connected to said coil for generating said enabling signal in response to reception of said control signal.

5. An interface circuit for control of a telephone system as defined in claim 2, wherein said telephone system is a PABX and said first and second types of said predetermined audio signals are DTMF tones.

6. An interface circuit for control of a telephone system as defined in claim 1, wherein said telephone system is a PABX for connection via tip and ring leads to a special telephone set having a plurality of contact switches connected to a matrix comprised of a plurality of row and column leads for causing generation of said one or more control signals to the PABX in response to predetemined ones of said row and column leads being interconnected as a result of predetermined ones of said contact switches being closed, and said control means includes switch means for connection to said matrix in parallel with said contact switches, and for causing predetermined ones of said row and column leads to be. interconnected, in response to reception of predetermined ones of said audio signals,
   whereby said PABX implements said one or more special features in response to reception of said control signals from the special telephone set.

7. An interface circuit for control of a telephone system as defined in claim 6, wherein the control means is comprised of:
   (a) a tone decoder for generating digital signals in response to reception of said predetermined audio signals
   (b) enabling means, connected to said decoder, for generating one or more enabling signals in response to said tone decoder generating said digital signals, and
   (c) the switch means including a plurality of switch array switches connected to said enabling means and said decoder for receiving said enabling signals and digital signals and interconnecting said predetermined ones of said row and column leads in response thereto.

8. An interface circuit for control of a telephone system as defined in claim 4, wherein said means for transmitting audio signals is comprised of:
   (a) an input lead for connection to the audio/visual unit,
   (b) amplifier means, connected to the input lead, for amplifying said audio signals, and
   (c) transformer means, connected to the amplifier means and said tip and ring leads for connection to the telephone system, for coupling said amplified signals form the amplifier means to the tip and ring leads.

9. A method for controlling a telephone system from an audio/visual unit for giving an audio/visual demonstration of one or more telephone system special features, comprising the steps of:
   (a) receiving DTMF tones from the audio/visual unit,
   (b) decoding said tones, and
   (c) generating one or more control signals for transmission to said telephone system in response to predetermined ones of said DTMF tones being decoded,
   whereby the telephone system implements said one or more special features in response to receiving said one or more control signals, simultaneously with the audio/visual unit giving said audio/visual demonstration of said special features.

10. An interactive audio/visual demonstration system, comprised of:
  (a) an audio/visual unit for giving an audio/visual demonstration of telephone system special features, having an output terminal for carrying for carrying audio signals,
  (b) a telephone system, for implementing one or more of said special features, and
  (c) an interface circuit, for connection to said output terminal and said telephone system, including means for receiving said audio signals from the output terminal and transmitting said signals to the telephone system, and means for generating one or more control signals, for transmission to the telephone system, in response to reception of a predetermined one or more of said audio signals,
  whereby said telephone system implements said one or more special features in response to receiving said control signals, simultaneously with the audio/visual unit giving said demonstration of said special features.

11. An interactive audio/visual demonstration system, as defined in claim 10, further comprising:
  (a) a speaker for broadcasting said audio signals,
  (b) means in said interface circuit for generating a disable signal in response to reception of said predetermined one or more audio signals, and
  (c) an audio transmission gate having an audio signal path for receiving said audio signals from the output terminal of the audio/visual unit and transmitting said audio signals to said speaker, and a disable input connected to said interface circuit for receiving said disable signal and inhibiting transmission of said audio signals in response thereto,
  whereby said transmission gate is disabled in reponse to reception of said predetermined one or more audio signals by said interface circuit and said interface circuit generating said disable signal, such that said predetermined one or more audio signals are not transmitted to the speaker.

12. An interactive audio/visual demonstration system, as defined in claim 11, wherein said predetermined one or more audio signals are DTMF tones.

13. An interactive audio/visual demonstration system, as defined in claim 10 wherein said telephone system is comprised of a PABX and one or more telephone sets connected thereto for special feature operation thereof by the telephone system.

14. An interactive audio/visual demonstration system, as defined in claim 10, wherein said telephone system is comprised of a special telephoneset and one or more standard telephone sets connected to a PABX for special feature operation thereof by the telephone system.

15. An interactive audio/visual demonstration system comprised of:
  (a) an audio/visual unit for giving an automatic audio/visual demonstration, having an output terminal for carrying voice signals and control tones,
  (b) a PABX including tip and ring leads for receiving said voice signals and control tones, means for detecting a hookswitch flash on said tip and ring leads, and means for implementing one or more special features,
  (c) a signal path for receiving said voice signals and control tones from said output terminal and transmitting said voice signals and control tones to said tip and ring leads,
  (d) means connected to said signal path, for receiving said control tones and generating command signals in response to reception of predetermined ones of said control tones, and
  (e) means for causing a simulated hookswitch flash on the tip and ring leads in response to reception of said command signals,
  whereby said telephone system implements said one or more special features in response to the detection of said hookswitch flash and reception of a further one or more of said control tones from the audio/visual system.

16. An interactive audio/visual demonstration system as defined in claim 15, wherein the signal path is comprised of:
  (a) an input lead connected to the audio/visual unit, for carrying said voice signals and control tones,
  (b) amplifier means connected to said input lead, for amplifying said voice signals and control tones, and
  (c) transformer means connected to the amplifier means and the tip and ring leads, for coupling said amplified voice signals and control tones to the PABX.

17. An interactive audio/visual demonstration system as defined in claim 16, wherein the means for receiving said control tones and generating said command signals is comprised of:
  (a) a tone decoder, connected to said input lead, for generating digital signals in response to reception of said control tones,
  (b) a demultiplexer connected to said decoder, for generating said decoded digital signals in response to reception of said digital signals, and
  (c) one or more flip-flops having first and second inputs thereof connected to predetermined outputs of said demultiplexer, for generating first and second ones of said command signals in response to receiving first and second ones of said decoded digital signals.

18. An interactive audio/visual demonstration system as defined in claim 15, wherein the means for causing a hookswitch flash is comprised of:
  (a) transistor means having a control input connected to said means for receiving said control tones and generating said command signal, and a current conduction circuit connected to ground for conducting current in response to reception of said command signals by said control input, and
  (b) relay means, having a moving contact for connection to one of said tip and ring leads and a coil connected to a source of potential and said current conduction circuit for closing said moving contact in response to current being conducted therethrough,
  whereby current is conducted from said potential source, through the coil and said current conduction. circuit to ground in response to a first one of said command signals being applied to the control input such that said moving contact closes, and no current flows in response to a second one of said command signals being applied, such that said moving contact momentarily opens, and current is subsequently conducted through the coil in response to said first command signal being applied to said control input such that said moving contact closes again, thereby causing a hookswitch flash on the tip and ring leads.

19. An interactive audio/visual demonstration system as defined in claim 16, wherein said control tones are DTMF tones.

20. An interface circuit for control of a telephone system as defined in claim 3, wherein said telephone system is a PABX and said first and second types of said predetermined audio signals are DTMF tones.

21. An interface circuit for control of a telephone system as defined in claim 4, wherein said telephone system is a PABX and said first and second types of said predetermined audio signals are DTMF tones.

22. An interface circuit for control of a telephone system as defined in claim 7, wherein said means for transmitting audio signals is comprised of:
   (a) an input lead for connection to the audio/visual unit,
   (b) amplifier means, connected to the input lead, for amplifying said audio signals, and
   (c) transformer means, connected to the amplifier means and said tip and ring leads for connection to the telephone system, for coupling said amplified signals from the amplifier means to the tip and ring leads.

23. An interactive audio/visual demonstration system, as defined in claim 11 wherein said telephone system is comprised of a PABX and one or more telephone sets connected thereto for special feature operation thereof by the telephone system.

24. An interactive audio/visual demonstration system, as defined in claim 12 wherein said telephone system is comprised of a PABX and one or more telephone sets connected thereto for special feature operation thereof by the telephone system.

25. An interactive audio/visual demonstration system, as defined in claim 11, wherein said telephone system is comprised of a special telephone set and one or more standard telephone sets connected to a PABX for special feature operation thereof by the telephone system.

26. An interactive audio/visual demonstration system, as defined in claim 12, wherein said telephone system is comprised of a special telephone set and one or more standard telephone sets connected to a PABX for special feature operation thereof by the telephone system.

27. An interactive audio/visual demonstration system as defined in claim 17, wherein said control tones are DTMF tones.

28. An interactive audio/visual demonstration system as defined in claim 18, wherein said control tones are DTMF tones.

29. An interactive audio/visual demonstration system, comprising:
   (a) an audio/visual unit for giving an audio/visual demonstration of one or more predetermined functions of a digital machine, having an output terminal for carrying audio signals,
   (b) a digital machine, for implementing said one or more predetermined functions,
   (c) an interface circuit, for connection to said output terminals and said digital machine, including means for receiving said audio signals from the output terminal and generating one or more control signals for transmission to said digital machine in response to reception of a predetermined one or more of said audio signals,
   whereby said digital machine implements said one or more functions in response to receiving said one or more control signals, simultaneously with the audio/visual unit giving said demonstration,
   (d) a speaker for braodcasting said audio signals,
   (e) means in said interface circuit for generating a disable signal in response to reception of said predetermined one or more audio signals, and
   (f) an audio transmission gate having an audio signal path for receiving said audio signals from the output terminal of the speaker, and a disable input connected to said interface circuit for receiving said disable signal and inhibiting transmission of said audio signals in response thereto,
   whereby said transmission gate is disabled in response to reception of said predetermined one or more audio signals by said interface circuit and said interface circuit generating said disable signal, such that said predetermined one or more audio signals are prevented from being transmitted to the speaker.

30. An interactive audio/visual demonstration system, as defined in claim 29, wherein said predetemrined one or more audio signals are DTMF tones.

31. An interactive audio/visual demonstration system, as defined in claim 30, wherein said digital machine is comprised of a computer.

* * * * *

UNITED STATES PATENT AND TRADEMARK OFFICE
CERTIFICATE OF CORRECTION

PATENT NO. : 4,685,122

DATED : August 4, 1987

INVENTOR(S) : Daniel A. Deveson and Anthony J. Bawcutt

It is certified that error appears in the above-identified patent and that said Letters Patent is hereby corrected as shown below:

In Column 15, line 20, after "said" insert --audio signals--;

In Column 16, line 19, delete the period ".";

In Column 16, line 51, delete "form" and insert --from--;

In Column 17, line 5, delete "for carrying" (second occurrence);

In Column 18, line 58, delete the period "."; and

In Column 20, line 26, delete "braodcasting" and insert "broadcasting".

Signed and Sealed this

Twenty-sixth Day of January, 1988

Attest:

DONALD J. QUIGG

Attesting Officer      Commissioner of Patents and Trademarks